US012767500B2

(12) United States Patent
Walsh

(10) Patent No.: US 12,767,500 B2
(45) Date of Patent: Oct. 20, 2026

(54) DIVING BOARD LIFTER

(71) Applicant: Duraflex International Corporation, Sparks, NV (US)

(72) Inventor: Matt Walsh, Sparks, NV (US)

(73) Assignee: Duraflex International Corporation, Sparks, NV (US)

(*) Notice: Subject to any disclaimer, the term of this patent is extended or adjusted under 35 U.S.C. 154(b) by 455 days.

(21) Appl. No.: 18/349,543

(22) Filed: Jul. 10, 2023

(65) Prior Publication Data

US 2024/0010478 A1 Jan. 11, 2024

Related U.S. Application Data

(60) Provisional application No. 63/388,024, filed on Jul. 11, 2022.

(51) Int. Cl.
*B66F 3/00* (2006.01)
*A63B 5/10* (2006.01)

(52) U.S. Cl.
CPC ................ *B66F 3/005* (2013.01); *A63B 5/10* (2013.01); *A63B 2244/203* (2013.01)

(58) Field of Classification Search
CPC ........ A63B 5/10; B66F 1/025; B66F 2700/05; B66F 2700/055; B66F 2700/09; B66F 2700/00; B66F 3/24; B66F 3/247; B66F 3/28; B66F 3/36; B66F 7/0608; B66F 7/0641; B66F 7/08; B66F 7/085;
(Continued)

(56) References Cited

U.S. PATENT DOCUMENTS 3,030,108 A * 4/1962 Baker ...................... A63B 5/10
403/33
3,350,093 A 10/1967 Nightingale
(Continued)

FOREIGN PATENT DOCUMENTS

| | | |
|---|---|---|
| CA | 2075618 A1 | 2/1994 |
| CN | 203507388 U | 4/2014 |

(Continued)

OTHER PUBLICATIONS

Extended European Search Report, European Appl. No. 23183905.1, dated Dec. 7, 2023, 7 pages.
(Continued)

*Primary Examiner* — Tyrone V Hall, Jr.
(74) *Attorney, Agent, or Firm* — Stinson LLP

(57) ABSTRACT

A diving board lifter and diving board assemblies for lifting a board to a raised position and lowering the board to a dive position. The lifter can mount between a fulcrum assembly and a rear anchor and along an alignment rod of a diving board stand. The lifter can include redundant primary and secondary mechanical safeties for locking the board in a raised position. The lifter can employ a lead screw that moves a linkage including a carriage, a pivot arm, and a pivot shaft to raise and lower the board. An extension shaft can be retracted when the lift is lowered so that a board support member of the lift is spaced below the board. The diving board assembly can include a fulcrum roller and traction material on the board for roller engagement. The lift can press the board support member against the traction material to lift the board.

19 Claims, 15 Drawing Sheets

(58) Field of Classification Search
CPC ...... B66F 7/10; B66F 7/22; B66F 7/28; B66F 7/14; E04F 21/1822
See application file for complete search history.

(56) References Cited

U.S. PATENT DOCUMENTS

| | | | | | |
|---|---|---|---|---|---|
| 3,450,404 | A | | 6/1969 | Nightingale | |
| 5,326,336 | A | * | 7/1994 | Wemlinger | A63B 5/10 254/3 R |
| 7,753,323 | B2 | | 7/2010 | Volk | |
| 2020/0391066 | A1 | | 12/2020 | Walsh et al. | |

FOREIGN PATENT DOCUMENTS

| | | | | | |
|---|---|---|---|---|---|
| CN | 210047591 | U | | 2/2020 | |
| WO | WO-2019071173 | A1 | * | 4/2019 | A63B 5/10 |

OTHER PUBLICATIONS

Divegym Equipment, Hydraulic Lifters, May 12, 2022, http://www.diveguy.com/uk/dive-equipment/diving/hydraulic-lifters/.
Duraflex Equipment, photograph of Boardlift, duraflex.de/lift.html.

* cited by examiner

DIVING BOARD LIFTER

CROSS-REFERENCE TO RELATED APPLICATION

This application claims priority to U.S. Provisional Patent Application No. 63/388,024, filed Jul. 11, 2022, which is hereby incorporated by reference in its entirety.

FIELD

This disclosure generally pertains to a lifter for a diving board.

BACKGROUND

Many swimming pools of the type used in competitions have multipurpose areas. For example, some pools have areas that can be used for diving competitions and swim race competitions. But the diving board is a permanent fixture at the pool, so there is a need for safe ways of moving the diving board out of the way when there is another type of event occurring in the diving area of the pool.

Competitive diving boards are only attached to the ground at a single point of connection—specifically, at a rear hinge point. This enables a proprietor to tilt the board upward and out of the way when the diving area of the pool is being used for another purpose. But diving boards are heavy, and so it is advantageous to provide mechanical advantage for lifting the board and support for holding the board in the lifted position.

The prior art, including U.S. Pat. Nos. 7,753,323 and 5,326,336, has proposed placing a mechanized lifting device below a diving board to facilitate lifting the board out of the way of other types of competition. But the inventors have recognized the opportunity for improvements in the field of diving board lifters.

SUMMARY

In one aspect, a board lifter is configured for selectively lifting a diving board to a raised position and lowering the diving board to a dive position. The diving board is supported on a stand comprising a fulcrum assembly, a rear anchor, and an alignment rod having a first end portion fastened to the fulcrum assembly and an opposite second end portion fastened to the rear anchor. The board lifter comprises a base. A board support member is movable relative to the base between a lowered position and a raised position. A lift operatively connects the board support member to the base. The lift is selectively adjustable between a lowered configuration in which the lift is configured to position the board support member at the lowered position and a raised configuration in which the lift is configured to position the board support member at the raised position. The base is configured to mount the board lifter between the fulcrum assembly and the rear anchor along the alignment rod such that: in the lowered position, the board member allows the diving board to be lowered to the dive position; and in the raised position, the board support member supports the diving board at the raised position.

In another aspect, a board lifter is configured for selectively lifting a diving board to a raised position and lowering the diving board to a dive position, the board lifter comprises a base. A board support member is movable relative to the base between a lowered position and a raised position. A lift operatively connects the board support member to the base. The lift is selectively adjustable between a lowered configuration in which the lift is configured to position the board support member at a lowered position and a raised configuration in which the lift is configured to position the board support member at the raised position. The lift comprises a lead screw mechanism for selectively adjusting the lift between the lowered configuration and the raised configuration. The lead screw mechanism provides a primary mechanical safety for locking the lift in the raised configuration. The board lifter further comprises a locking pin that is selectively positionable to lock a portion of the lift in place with respect to the base to lock the lift in the raising position relative to the base and thereby provide a secondary mechanical safety for locking the lift in the raised configuration.

In another aspect, a board lifter configured for selectively lifting a diving board to a raised position and lowering the diving board to a dive position. The board lifter comprises a base. A board support member is movable relative to the base between a lowered position and a raised position. A lift operatively connects the board support member to the base. The lift is selectively adjustable between a lowered configuration in which the lift is configured to position the board support member at a lowered position and a raised configuration in which the lift is configured to position the board support member at the raised position. The lift comprises a lead screw configured to be rotated about a screw axis. A carriage is threadably connected to the lead screw such that by rotation of the lead screw about the screw axis the carriage is moveable along the lead screw relative to the base in a range of motion that includes a lowering position and a raising position. A pivot shaft has a shaft length extending from a first shaft end portion to a second shaft end portion. The first shaft end portion is pivotably connected to the base for rotation with respect to the base about a shaft tilt axis. A pivot arm has an arm length extending from a first arm end portion to a second arm end portion. The first arm end portion is pivotably connected to the carriage for rotation with respect to the carriage about an arm tilt axis. The second arm end portion is pivotably connected to the pivot shaft at a location spaced apart along the shaft length from the first shaft end portion toward the second shaft end portion such that the base, the carriage, the pivot arm, and the pivot shaft form a linkage configured to pivot the pivot shaft about the shaft tilt axis as the carriage moves along the lead screw in the range of motion. The linkage is configured to pivot the pivot shaft to a raising position when the carriage moves to the raising position whereby the linkage adjusts the lift to the raised configuration. The linkage is configured to pivot the pivot shaft to the lowering position when the carriage moves to the lowering position whereby the linkage adjusts the lift to the lowered configuration.

In another aspect, a board lifter configured for selectively lifting a diving board to a raised position and lowering the diving board to a dive position. The board lifter comprises a base. A board support member is movable relative to the base between a lowered position and a raised position. A lift operatively connects the board support member to the base. The lift is selectively adjustable between a lowered configuration in which the lift is configured to position the board support member at a lowered position and a raised configuration in which the lift is configured to position the board support member at the raised position. An extension shaft connects the board support member to the lift. The extension shaft is movable in relation to the lift between an extended position and a retracted position. When the lift is in the lowered configuration, the extension shaft is configured in the retracted position to position the board support member at a stowed position in which the board support member is spaced apart below the diving board and the extension shaft is configured in the extended position to position the board support member at the lowered position in contact with the diving board.

In another aspect, a diving board assembly comprises a diving board stand comprising a fulcrum assembly, a rear anchor, and an alignment rod having a first end portion fastened to the fulcrum assembly and an opposite second end portion fastened to the rear anchor. A diving board is movable in relation to the stand between a raised position and a dive position. The board lifter as described in any of the four preceding paragraphs provided and configured to adjust the diving board between the raised position and the dive position by adjusting the lift between the raised configuration and the lowered configuration.

In another aspect, a diving board assembly comprises a diving board stand including a fulcrum roller assembly comprising a fulcrum roller rollably adjustable in a lengthwise range of motion and a rear hinge. A diving board is supported on the stand. The diving board comprises a main body including a front end portion and a rear end portion opposite the front end portion. The rear end portion of the main body is fastened to the rear hinge such that the diving board is rotatable about the rear hinge between a dive position at which the diving board is supported on the fulcrum roller and a raised position at which the diving board is spaced apart from the fulcrum roller. The diving board further comprises a traction material along a section of the diving board between the front end portion and the rear end portion. The traction material is configured so that the fulcrum roller rolls along the traction material along an entire extent of the range of motion when the diving board is in the dive position. A board lifter comprises a base, a board support member, and lift configured for moving the board support member in relation to the base to lift the diving board from the dive position to the raised position. The lift presses the board support member against the traction material to lift the diving board from the dive position to the raised position.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

Figure 1:
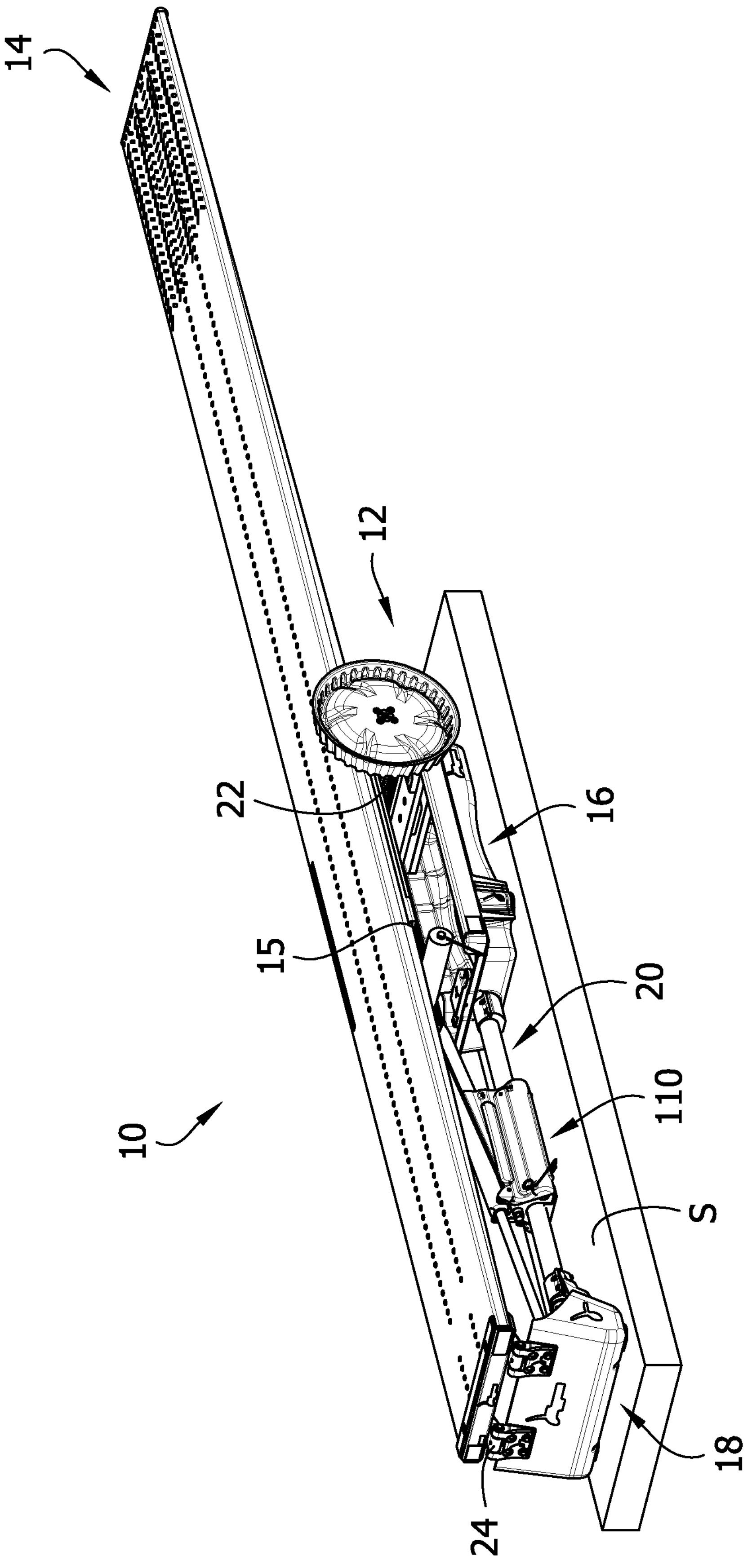
FIG. 1 is a perspective of a diving board assembly in a dive configuration wherein a diving board is in a dive position and a board lifter is in a stowed configuration.

Referring to FIGS. 1-3A, an exemplary embodiment of a diving board assembly in the scope of the present disclosure is generally indicated at reference number 10. The diving board assembly broadly comprises a stand, generally indicated at reference number 12, and a diving board, generally indicated at reference number 14. In one embodiment, the stand 12 and diving board 14 are of the type disclosed in U.S. Pat. No. 11,318,339, which is hereby incorporated by reference in its entirety. Accordingly, the diving board 14 preferably comprises an aluminum extrusion of the type sold by Duraflex International. The diving board 14 further comprises a section of traction material 15 (e.g., rubber or rubberized padding) on a bottom region of the board for engagement with the stand 12. The length of the traction material 15 is less than half the length of the board 14 overall (e.g., the length of the traction material 15 is less than one-fourth the length of the board 14 overall).

Figure 3:
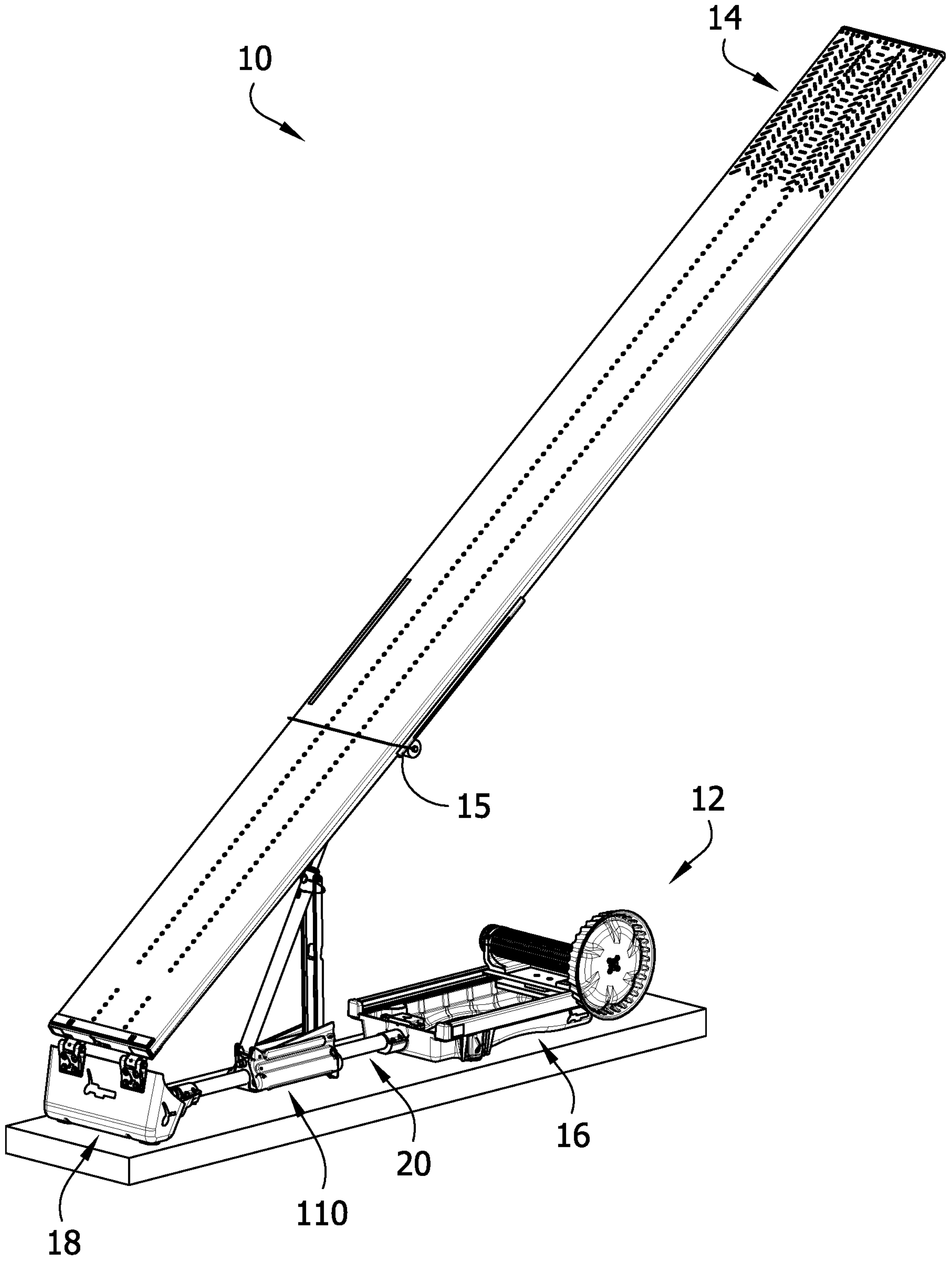
FIG. 3 is a perspective similar to FIGS. 1 and 2 showing the board lifter adjusted to a raised configuration thereby adjusting the diving board to a raised position.
Figure 3A:
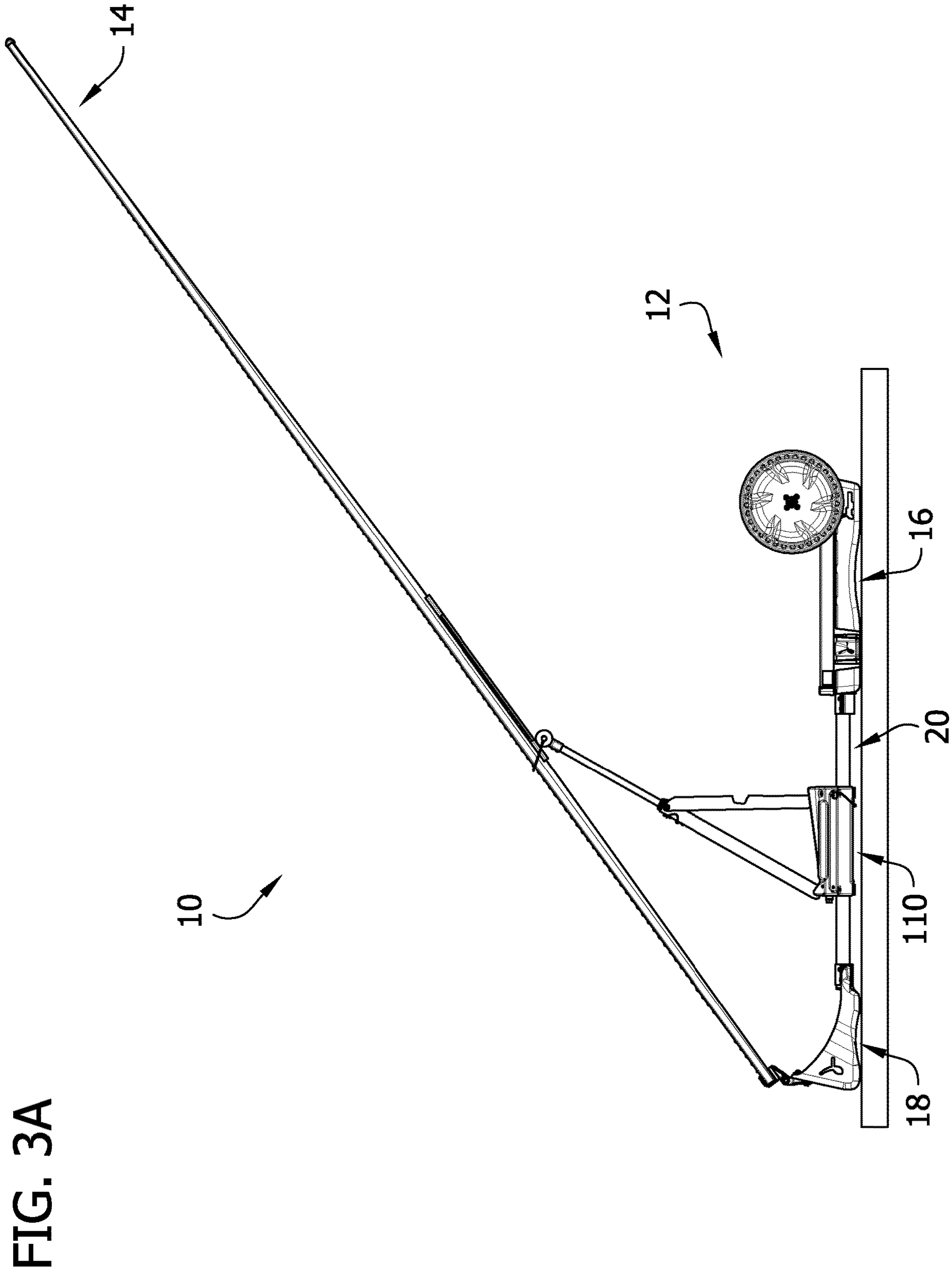
FIG. 3A is an elevation of the diving board assembly in the configuration of FIG. 3.

In the illustrated embodiment, the diving board stand 12 comprises a fulcrum assembly 16, a rear anchor 18, and an alignment rod 20 having a front end portion fastened to the fulcrum assembly and an opposite rear end portion fastened to the rear anchor. As explained in U.S. Pat. No. 11,318,339, the fulcrum assembly 16 and the rear anchor 18 are separate components that mount separately on a substrate S, such as a diving platform or ground surface. The alignment rod 20 is configured to attach to certain prefabricated rod receiving features of the fulcrum assembly 16 and the rear anchor 18 to ensure that the two separate components are mounted on the substrate S in proper alignment with one another. The fulcrum assembly 16 comprises a fulcrum roller 22 which defines a front point of contact between the board 14 and the stand 12. The diving board 14 rests on the fulcrum roller 22 but is not fastened to the roller. As is known to those skilled in the art, the roller 22 is rollably adjustable along the length of the diving board 14 in a limited range of motion to adjust the feel of the diving board. The range of motion of the fulcrum roller 22 generally corresponds to the length of the section of traction material 15 on the bottom of the board 14. In other words, the traction material 15 is located above the fulcrum assembly 16 so that the fulcrum roller 22 will roll along the traction material throughout its entire range of motion. In one or more embodiments, the fulcrum range of motion has a length extending from a front position to a rear position and the traction material protrudes forward of the front end position and rearward of the rear end position by no more than 25% of the length of the range of motion (e.g., protrudes in each direction by no more than 20%, no more than 15%, or no more than 10% of the length of the fulcrum range of motion). The rear anchor 18 attaches to the rear end portion of the diving board at a rear hinge 24. The rear hinge is the only location where the board 14 is fastened to the stand. Thus as can be seen in FIGS. 3 and 3A, the rear hinge 24 allows the diving board 14 to be raised by rotating the board about the axis of rotation of the rear hinge.

The illustrated diving board assembly 10 further comprises a board lifter, generally indicated at reference number 110. The board lifter is broadly configured for raising and lowering the diving board 14 between a dive position shown in FIGS. 1 and 1A and a raised position shown in FIGS. 3 and 3A. In the dive position, the diving board assembly 10 is operational such that a diver can step onto the board 14 and perform a dive. FIGS. 2 and 2A show an intermediate configuration between the dive position and raised position in which the board lifter 110 is extended to engage the diving board 14 so that the board lifter can subsequently be actuated to lift the board to the raised position. In the raised position, the diving board assembly 110 is non-operational. Furthermore, in the raised position, the diving board 14 is stowed out of the way of the pool area over which the diving board extends when in the dive positon. This allows the pool operator to selectively utilize the pool area that is typically reserved for diving for other activities, e.g., swim races or other forms of aquatic competition, performance, or recreation.

Figure 4:
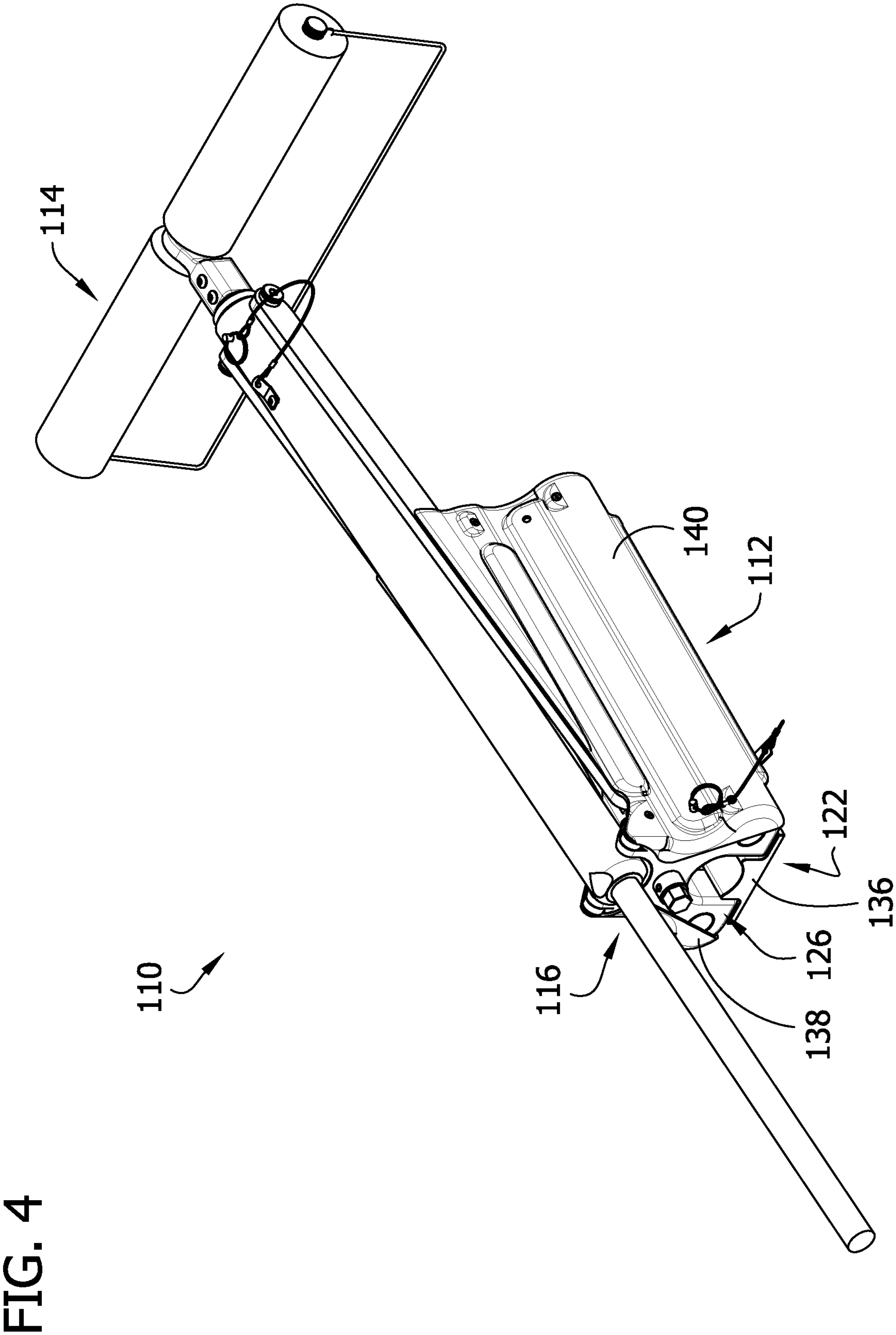
FIG. 4 is a perspective of the board lifter.
Figure 5:
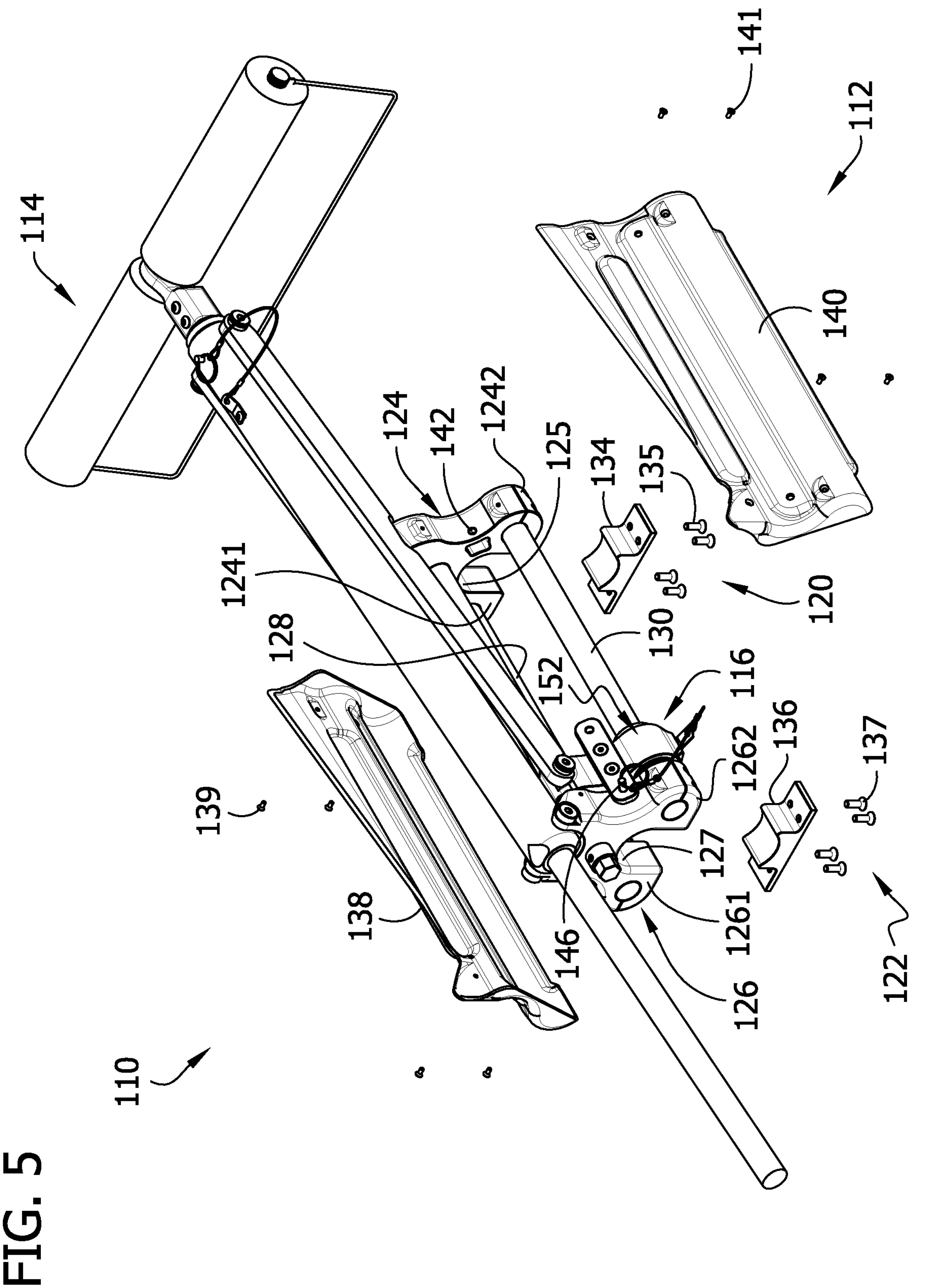
FIG. 5 is an exploded perspective of the board lifter.
Figure 6:
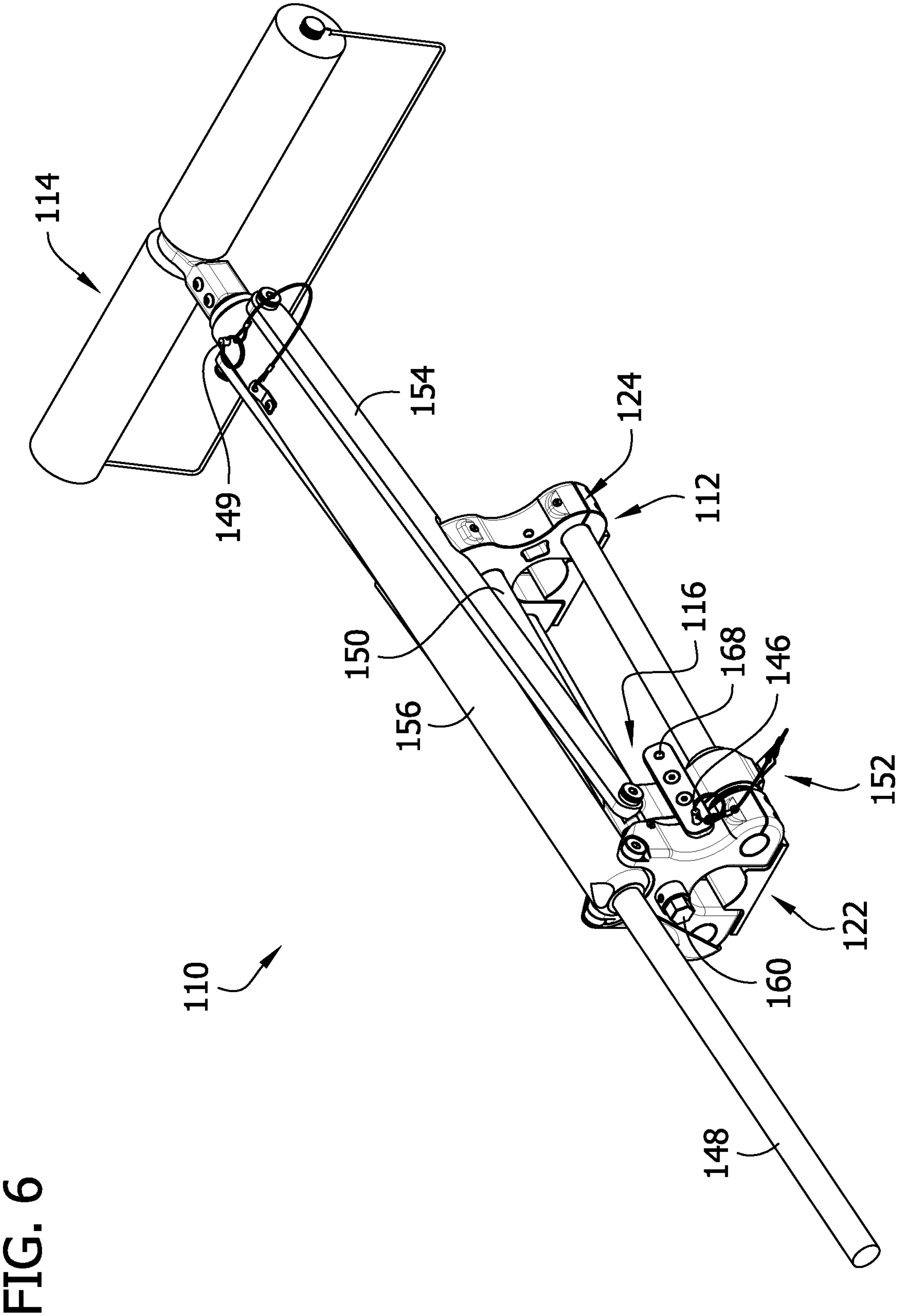
FIG. 6 is a perspective of the board lifter with a base cover removed from the base wherein the board lifter is in the same configuration as FIG. 1.
Figure 6A:
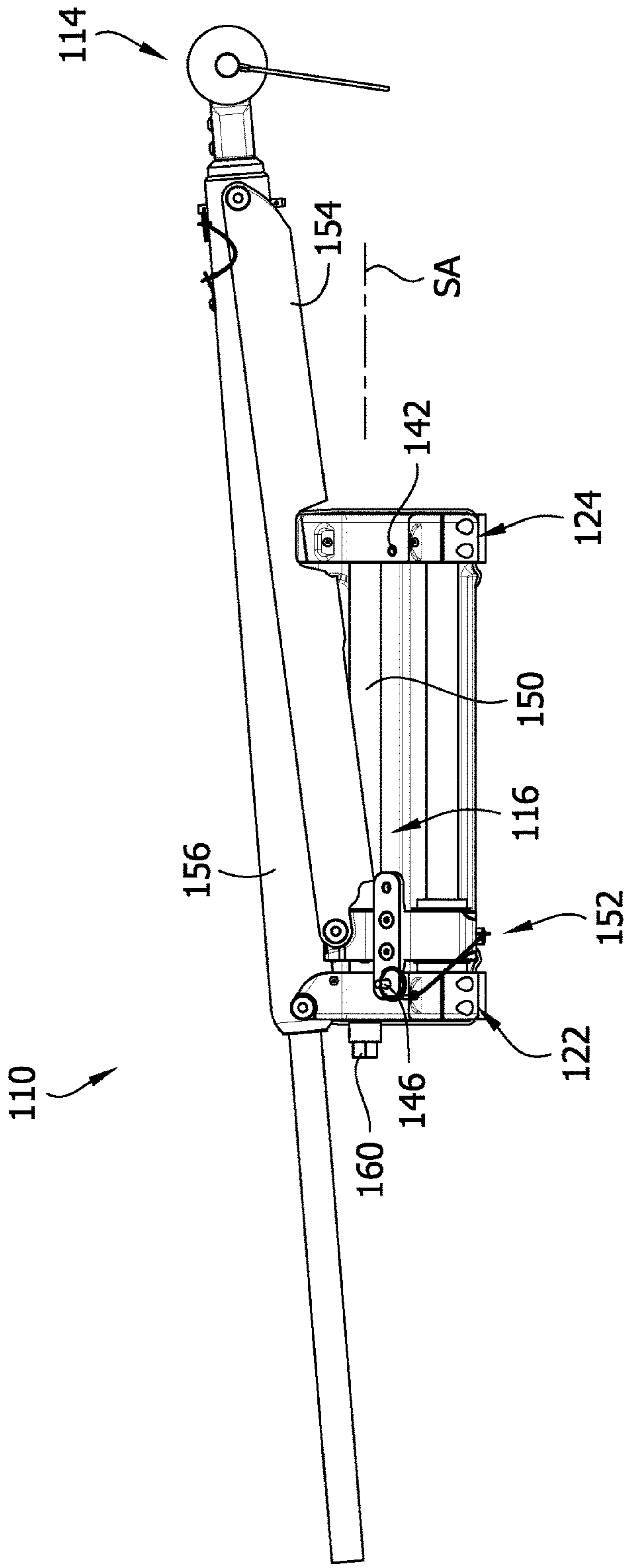
FIG. 6A is an elevation of the board lifter as shown in the perspective of FIG. 6.

Referring to FIGS. 4 and 5, the board lifter 110 generally comprises a base 112, a board support member 114, and a lift 116. As will be explained in further detail below, the base 112 is broadly configured to support the board lifter 110 below the diving board 14, between the fulcrum assembly 16 and the rear anchor 18 and along the alignment rod 20. The board support 114 member is movable relative to the lift 116 and the base 112 between a stowed position (FIGS. 1 and 1A) in which the board support member 114 is spaced apart below the diving board 14 and a support position (FIGS. 2 and 2A) in which the board support member contacts the bottom side of the diving board (e.g., contacts the traction material 115). As explained more fully below, the lift 116 is broadly configured to move the board support member 114 relative to the base 112 for raising and lowering the diving board 14. The lift 116 is selectively adjustable between a lowered configuration (FIGS. 2 and 2A) in which the lift positions the board support member 114 at a lowered position that allows the diving board to be lowered to the dive position and a raised configuration (FIGS. 3 and 3A) in which the lift positions the board support member 116 at a raised position in which the board support member supports the diving board at the raised position.

Referring again to FIGS. 4 and 5, the base 112 comprises an assembly that is configured to mount the board lifter 110 between the fulcrum assembly 16 and the rear anchor 18 along the alignment rod 20. In the illustrated embodiment, the base 112 is configured to straddle the alignment rod 20. More particularly, the base 112 is configured to mount directly on the alignment rod 20. More particularly still, the illustrated base 112 is configured to mount directly on the alignment rod 20 such that the entire board lifter 110 is spaced apart above the substrate S, as shown in FIGS. 1-3A. Although the illustrated embodiment of the board lifter is configured to straddle the alignment rod and mount directly thereon, it will be understood that other embodiments of a diving board lifter in accordance with the present disclosure can be used with diving board assemblies of other types, including diving board assemblies comprising a stand that lack an alignment rod between a fulcrum assembly and a rear anchor. In other words, it is not strictly necessary for a diving board lifter to be mounted along an alignment rod of a diving board stand.

Referring to FIG. 5, in one or more embodiments the base 112 comprises at least one clamping assembly 120, 122 for securing the board lifter at the operative position below the diving board 14. In the illustrated embodiment, the base 112 comprises a front clamping assembly 120 and a rear clamping assembly 122 configured to clamp onto the alignment rod 20 in order to operatively secure the lifter 110 to the diving board assembly 10. Each clamping assembly 120, 122 comprises a saddle member 124, 126 configured to be positioned generally above and astraddle of the alignment rod 20. Each saddle member 124, 126 comprises a lower portion including an arcuate downward-facing rod engagement surface 125, 127 of corresponding size and shape to the outer perimeter of the alignment rod 14. Each clamping assembly 120, 122 further comprises a bottom piece 134, 136 configured to be selectively fastened (e.g., bolted or screwed via screws 135, 137) to the corresponding saddle member 124, 126 to clamp the alignment rod 20 between the saddle member and the bottom piece. When secured in place, the bottom piece 134, 136 presses upward on the alignment rod 20, firmly clamping the alignment rod against the arcuate downward-facing rod engagement surface 125, 127 of the corresponding saddle member 124, 126.

The lower portion of each saddle member 124, 126 further comprises a pair of left and right leg sections 1241, 1242, 1261, 1262 on opposite sides of the respective rod engagement surface 125, 127. The base 112 comprises a left guide shaft 128 extending from the left leg section of the front saddle member 124 to the left leg section of the rear saddle member 126 and a right guide shaft 130 extending from the right leg section of the front saddle member to the right leg section of the rear saddle member. The front and rear end portions of the guide shafts 128, 130 are firmly secured to the corresponding leg sections 1241, 1242, 1261, 1262 of the front and rear saddle members 124, 125, whereby the guide shafts support the clamping assemblies 120, 122 in spaced apart relationship with one another. In the illustrated embodiment, the base further comprises left and right base cover members 138, 140, secured on the saddle members 124, 126 via screws 139, 141. The right cover member 14 is visible in FIGS. 1-5 but removed in all other drawings to show other features more clearly.

In the illustrated embodiment, the base 112 comprises a front safety hole 142 and a rear safety hole 144 (FIGS. 8 and 8A) configured to mate with a locking pin 146. As will be explained in further detail below, the locking pin 146 can be selectively inserted into either of the safety holes 142, 144 in order to lock the lift in a raised or lowered configuration.

Referring to FIGS. 1-2A and 6-7A, the board lifter 110 is selectively adjustable between a dive configuration (FIGS. 1, 1A, 6, and 6A) in which the board support member 114 is spaced apart below the diving board 14 and an intermediate or extended configuration (FIGS. 2, 2A, 7, and 7A) in which the board support member 114 is extended upward in relation to the base 112 and the lift 116 to contact the bottom of the diving board 14, more particularly, to contact the traction material 15 on the bottom of the diving board. As explained more fully below, the lift 116 comprises a pivot shaft 156 that is configured to pivot upward to raise the diving board 14. The pivot shaft 156 comprises a tube. The board lifter 110 further comprises an extension shaft 148 engaged in telescopic sliding relationship with the pivot shaft 156. The board support member 114 is mounted on the front end of the extension shaft 148. The extension shaft 148 is movable in relation to the pivot shaft 157 between a retracted position shown in FIGS. 1, 1A, 6, and 6A and an extended position shown in FIGS. 2, 2A, 7, and 7A. When the lift 116 is in the lowered configuration and the extension shaft 148 is in the retracted position, the extension shaft positions the board support member 114 at a stowed/dive position in which the board support member is spaced apart below the diving board. From this configuration, the extension shaft 148 is extendable forwardly to the extending position at which the extension shaft positions the board support member 114 in contact with the traction material 15 of the diving board 14. In the illustrated embodiment, the board lifter 110 comprises a locking pin 149 for selectively locking the extension shaft 148 in position in relation to the pivot shaft 156 in each of the retracted position and the extended position.

Figure 7:
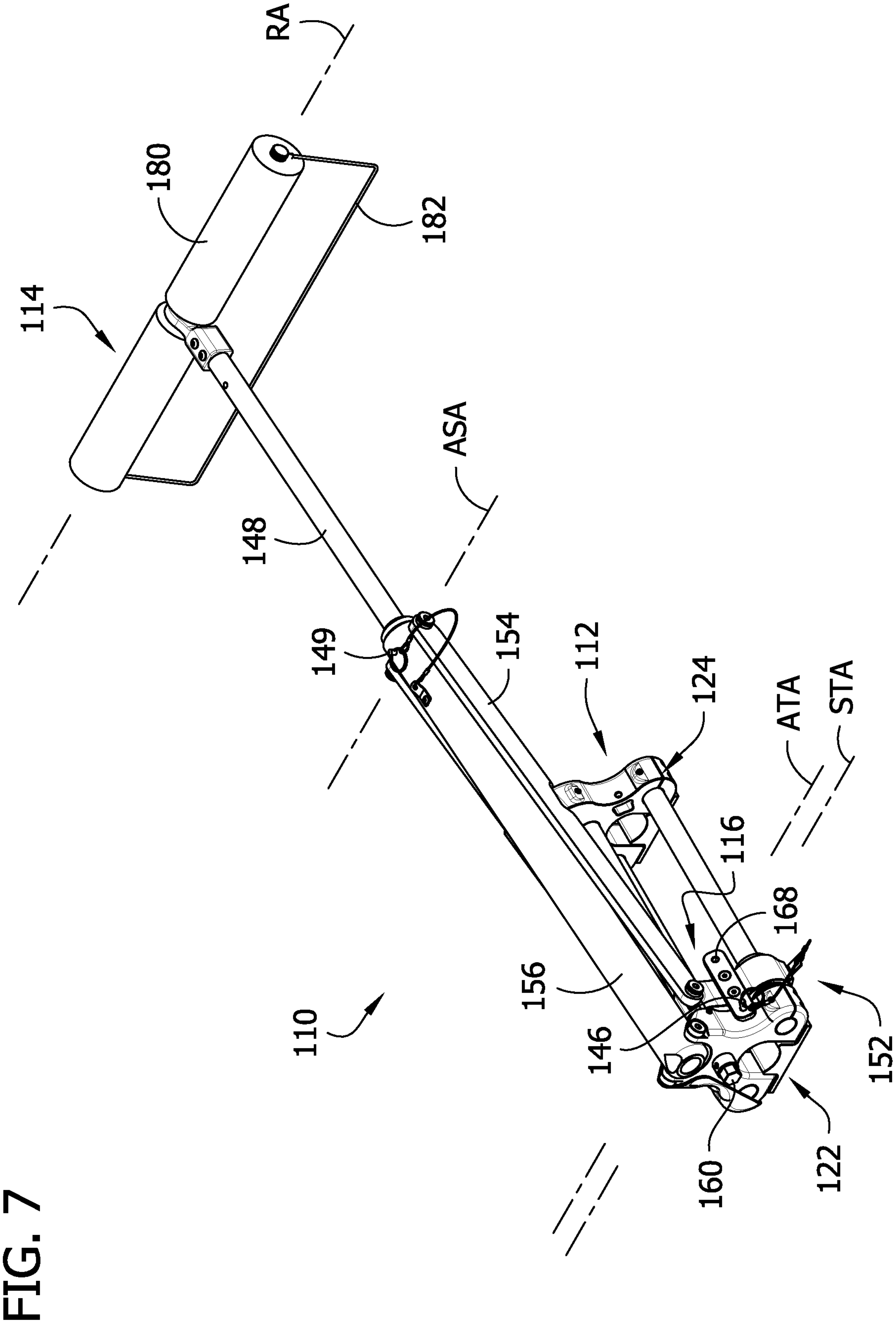
FIG. 7 is a perspective of the board lifter similar to FIG. 6 but showing the board lifter in the configuration of FIG. 2.
Figure 7A:
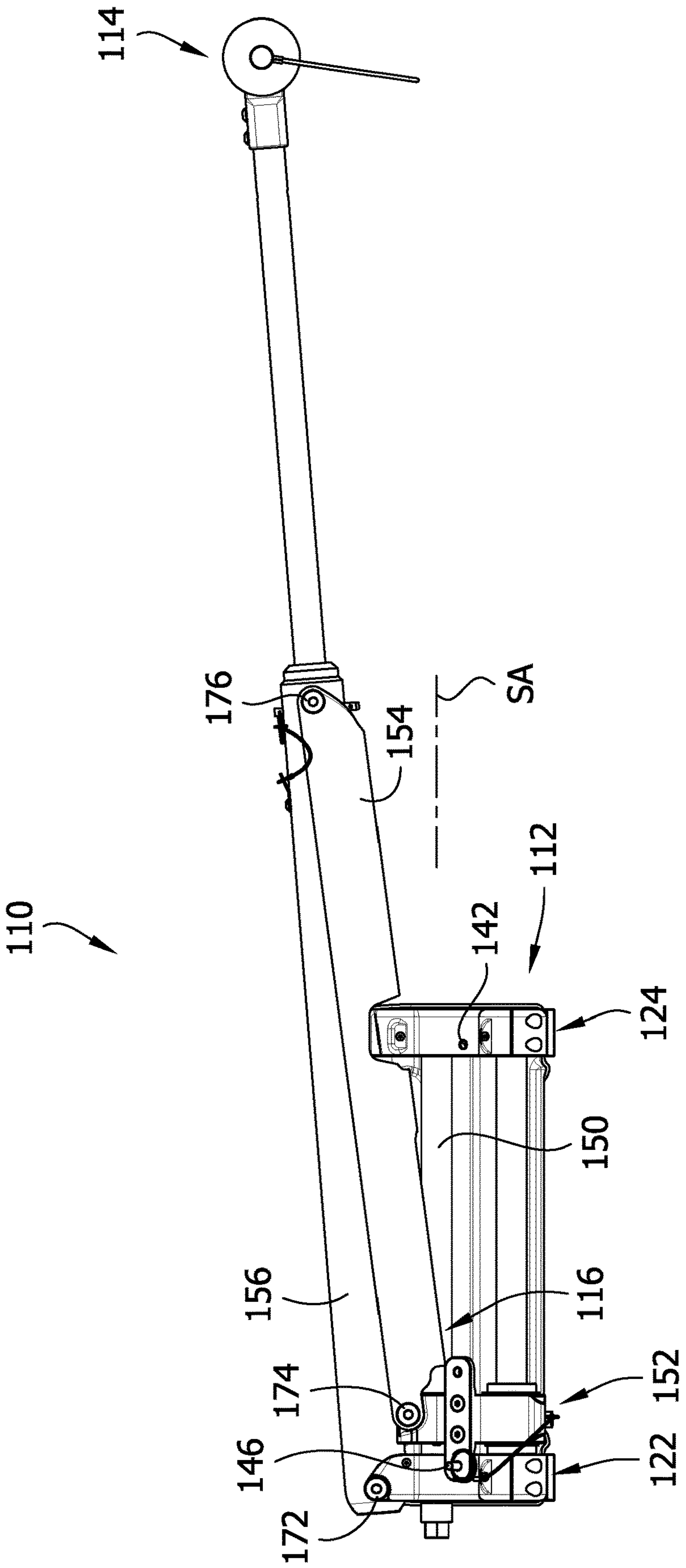
FIG. 7A is an elevation of the board lifter as shown in the perspective of FIG. 7.
Figure 8:
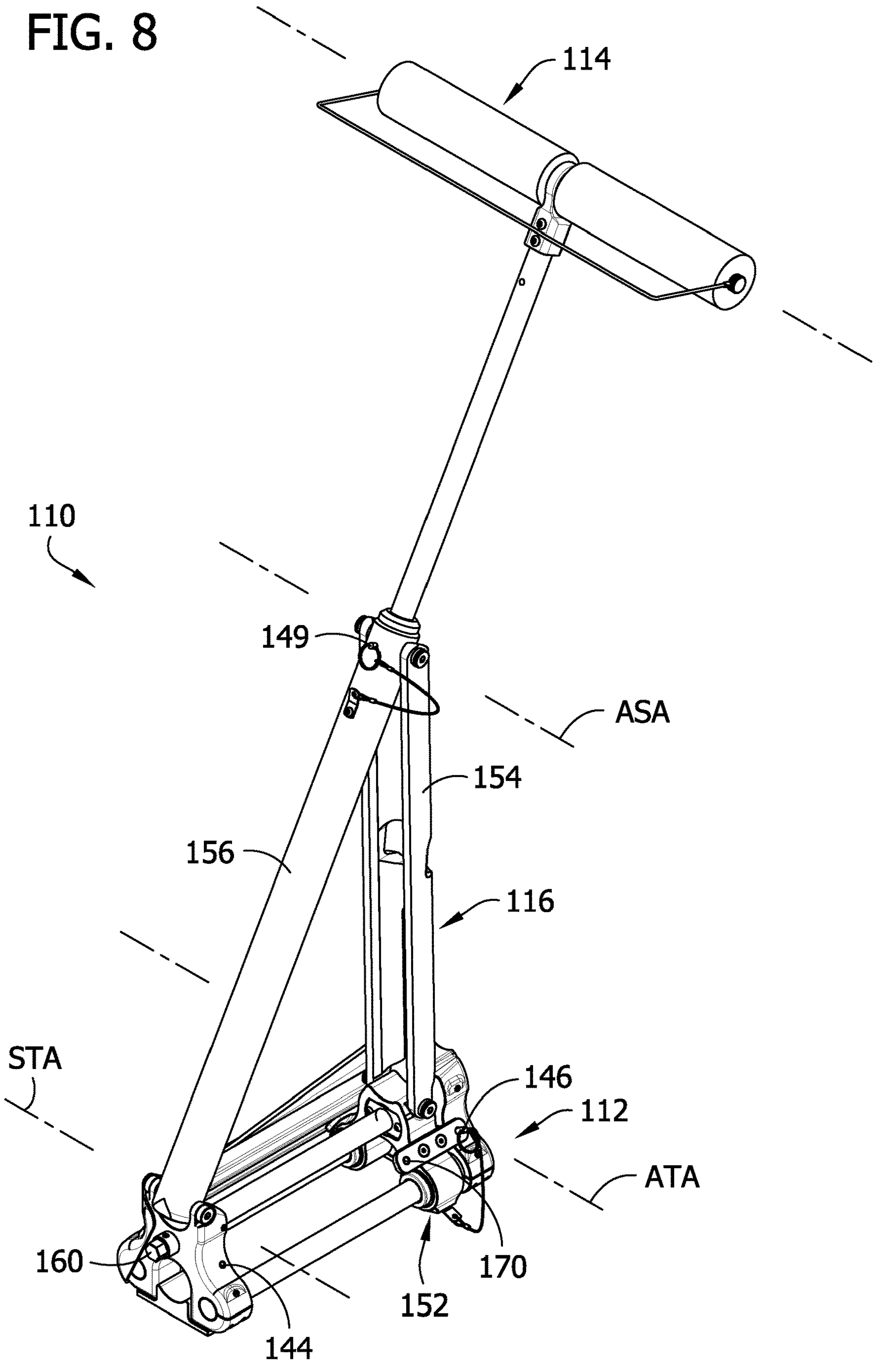
FIG. 8 is a perspective of the board lifter similar to FIG. 6 but showing the board lifter in the configuration of FIG. 3.
Figure 8A:
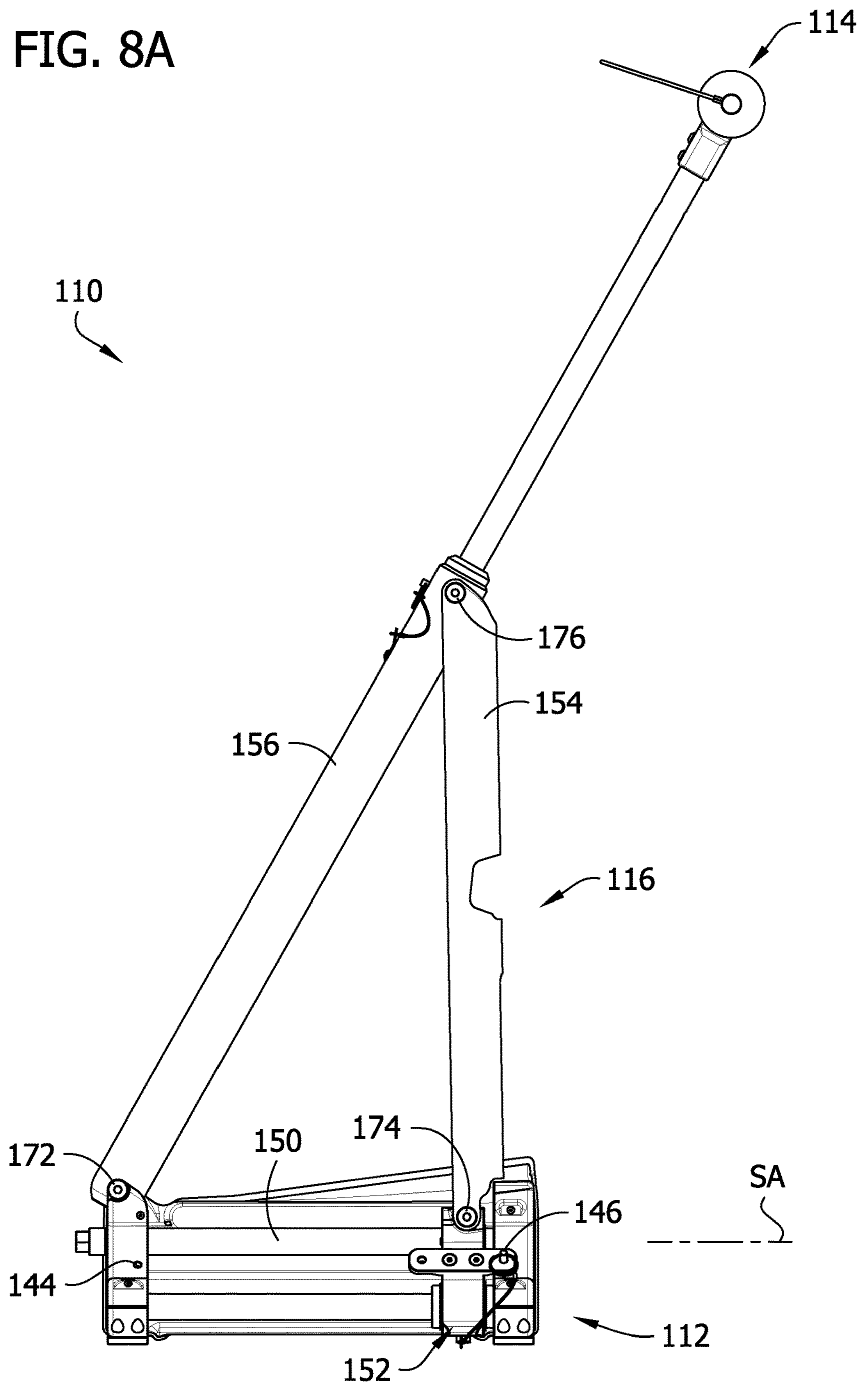
FIG. 8A is an elevation of the board lifter as shown in the perspective of FIG. 8.

Referring to FIGS. 7-8A, the lift 116 operatively connects the board support member 114 to the base 112 and is selectively adjustable between a lowered configuration (FIGS. 7 and 7A) in which the lift is configured to position the board support member at a lowered position and a raised configuration (FIGS. 8 and 8A) in which the lift is configured to position the board support member at the raised position. The illustrated lift 116 comprises a lead screw 150 configured to be rotated about a screw axis SA, a carriage 152 threadably connected to the lead screw, and pivot arm 154 and a pivot shaft 156 that are pivotably connected to the base 112 and the carriage to form a linkage configured for selectively raising and lowering the diving board 14 by adjusting the lift between the lowered configuration and the raised configuration. In the illustrated embodiment, the lead screw 150 is the input component (e.g., the actuator) of the lift linkage and the pivot shaft 156 is the output component. By rotating the lead screw 150, the pivot shaft 156 is adjustable between a raising position (FIGS. 7 and 7A) and a lowering position (FIGS. 8 and 8A). The lift 116 is configured to be manually adjusted between the lowered configuration and the raised configuration by rotating an input end 160 of the lead screw 150. For example, the input end 160 can have the shape of a hexagonal bolt head so that the lead screw 150 can be manually turned by a handheld driver. The board lifter 110 is free of any powered (e.g., electrical, pneumatic, or hydraulic) actuator for raising and lowering the diving board 14.

The lead screw 150 extends lengthwise along the screw axis SA between upper portions of the front and rear clamping assemblies 122, 124. The input end 160 of the lead screw 150 protrudes rearward from the base 112 so that the input end is accessible on the rear side of the rear clamping assembly 122 for adjusting the lift 116. The clamping assemblies 120, 122 include rotational bearing features that allow the lead screw 150 to freely rotate about the screw axis SA with respect to the base 112 without moving in translation along the screw axis.

Figure 9:
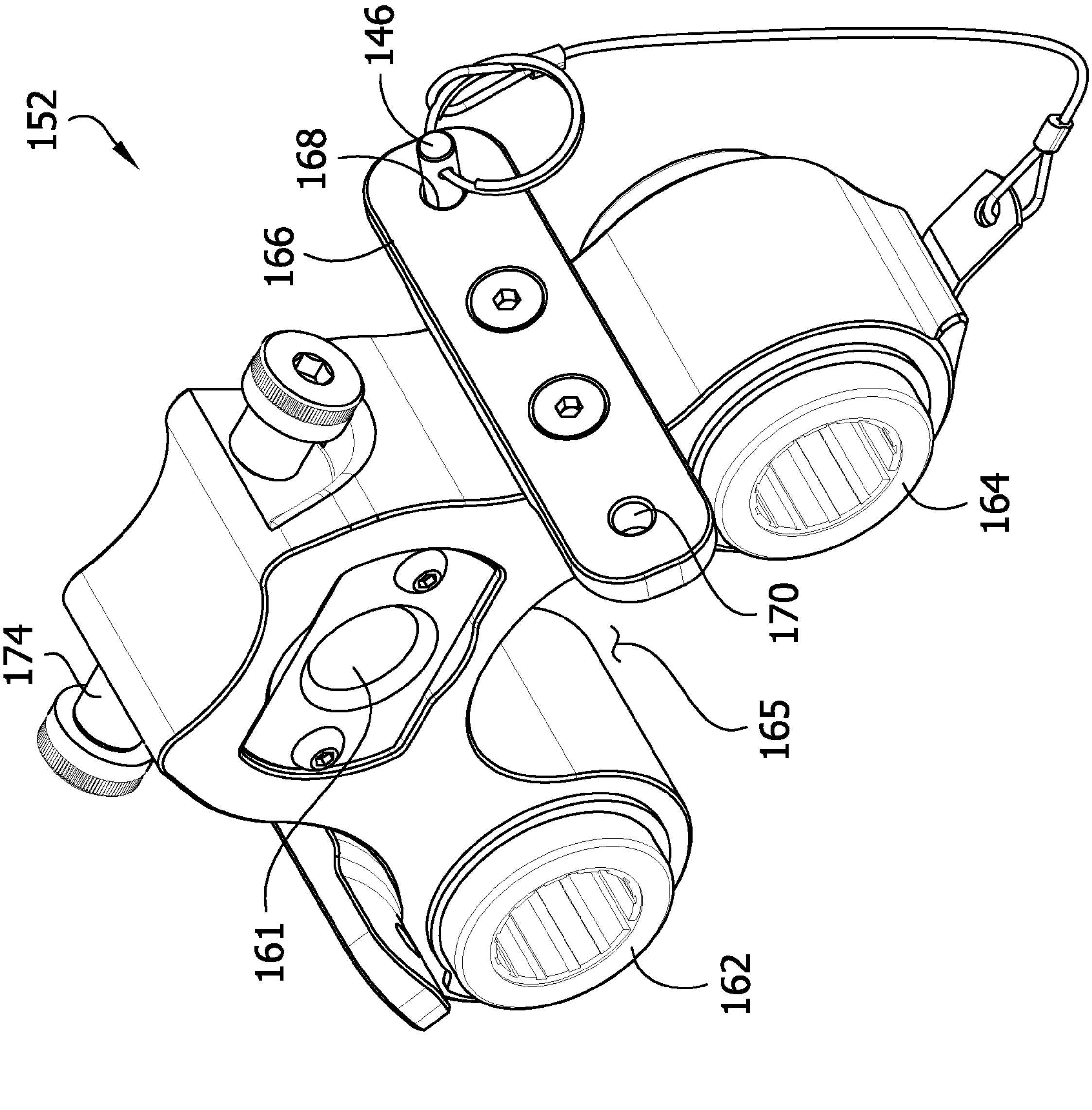
FIG. 9 is a perspective of a carriage of the board lifter.

Referring to FIG. 9, the upper end portion of the carriage 152 comprises a threaded nut 161 configured to threadably engage with the lead screw 150. The lower portion of the carriage 152 includes left and right slide bearings 162, 164 slidably receiving the left and right guide shafts 128, 130 therein. The carriage 152 comprises a longitudinal channel 165 between the left and right slide bearings 162, 164, which provides clearance for the alignment rod 20, allowing the carriage to move lengthwise along the alignment rod to adjust the lift 116. When the lead screw 150 is rotated, it threadably advances the carriage 152 along the lead screw in a limited range of motion. The nut 161 and bearings 162, 164 constrain the carriage 152 to a limited range of motion extending lengthwise along the shafts 128, 130 and lead screw 150. The range of motion of the carriage 152 includes a lowering position (FIGS. 7 and 7A) adjacent the rear clamping assembly 122 and a raising position (FIGS. 8 and 8A) adjacent the front clamping assembly 124.

In the illustrated embodiment, a lock plate 166 is secured to the left side of the carriage 152. The lock plate 166 defines at least one safety hole 168, 170 that is configured to align with the safety holes 142, 144 in the base 112 so that the locking pin 146 can be inserted through the lock plate safety hole into the base safety hole to lock the carriage 152 in place with respect to the base 112. In the illustrated embodiment, the lock plate 166 comprises a front safety hole 168 and a rear safety hole 170. When the carriage 152 is adjusted to the raising position, the front safety hole 168 aligns with the front safety hole 142 so that the locking pin 146 can be inserted through the front safety holes to lock the carriage in place with respect to the base in the raising position. When the carriage 156 is adjusted to the lowering position, the rear safety hole 170 aligns with the rear safety hole 144 so that the locking pin 146 can be inserted through the rear safety hole of the lock plate into the rear safety hole of the base 112 to lock the carriage 152 in position with respect to the base. It will be seen that the lead screw mechanism and the locking pin 146 provide redundant primary and secondary mechanical safeties for locking the lift 116 in the raised configuration. The lead screw 150 and nut 161 lock the carriage 152 in place to prevent inadvertent lowering of the diving board in response to any downward force on the board 14. The lead screw 150 will only rotate to lower the board 14 when directly rotated about the screw axis SA at the input end. In addition, the locking pin 146 will not allow the lift 116 to move from the raised configuration until the locking pin is removed from the front safety holes 142, 168. The redundant primary and secondary mechanical safeties ensure that the diving board 14 does not fall after it is raised by the board lifter 110.

The lift linkage is configured so that that, by rotation of the lead screw 150 about the screw axis SA, the carriage 152 is moveable along the lead screw relative to the base 112 in a range of motion that includes the lowering position and the raising position. The pivot shaft 156 has a shaft length extending from a rear shaft end portion to a front shaft end portion. The rear shaft end portion is pivotably connected to the base 112 by a pin 172 for rotation with respect to the base about a shaft tilt axis STA. The pivot arm 154 has an arm length extending from a rear arm end portion to a front arm end portion. The rear arm end portion is pivotably connected to the carriage 152 by a pin 174 for rotation with respect to the carriage about an arm tilt axis ATA. The front arm end portion is pivotably connected to the pivot shaft 156 by a pin 176 at a location spaced apart along the shaft length from the rear shaft end portion toward the front shaft end portion such that the shaft and arm are constrained to rotate relative one another about an arm-to-shaft pivot axis ASA. The pins 172, 174, 176 thus constrain the lift linkage so that the pivot shaft 156 rotates upward and downward about the shaft tilt axis STA as the lead screw 150 is rotated about the screw axis SA to drive the carriage 152 along the lead screw in its limited range of motion. The linkage is configured to pivot the pivot shaft 156 to a raising position when the carriage 152 moves to the raising position, whereby the linkage adjusts the lift 116 to the raised configuration. Likewise, the linkage is configured to pivot the pivot shaft 156 to the lowering position when the carriage 152 moves to the lowering position, whereby the linkage adjusts the lift 116 to the lowered configuration.

In the illustrated embodiment, the board support member 114 comprises a roller 180 that is connected to the front end portion of the extension shaft 148 for rotation with respect to the extension shaft about a roller axis RA. The roller axis RA is oriented parallel to the linkage's pivot axes ATA, STA, ASA and perpendicular to the screw axis SA. During use, as the lift 116 raises and lowers the diving board 14, the roller 18 rolls along the traction material 15, providing smooth engagement between the board lifter 100 and the diving board.

In the illustrated embodiment, the board lifter 110 further comprises a lanyard 182. As shown in FIGS. 2 and 2A, when the board support member 114 is extended, the lanyard 182 can be looped over the top of the diving board 14 to secure the board laterally with respect to the roller 180.

Having described many of the details of the diving board assembly 10, this disclosure now turns to exemplary methods for using the diving board assembly. Firstly, as to installation, it can be seen that in the illustrated embodiment, the board lifter 110 could be installed on the stand 12 during initial installation of the diving board 10 or at a later time. To install the board lifter 110, a technician simply uses the screws 135, 137 to fasten the bottom pieces 134, 135 to the saddle members 124, 126 to clamp the clamping assemblies 120, 122 onto the alignment rod 20.

Figure 1A:
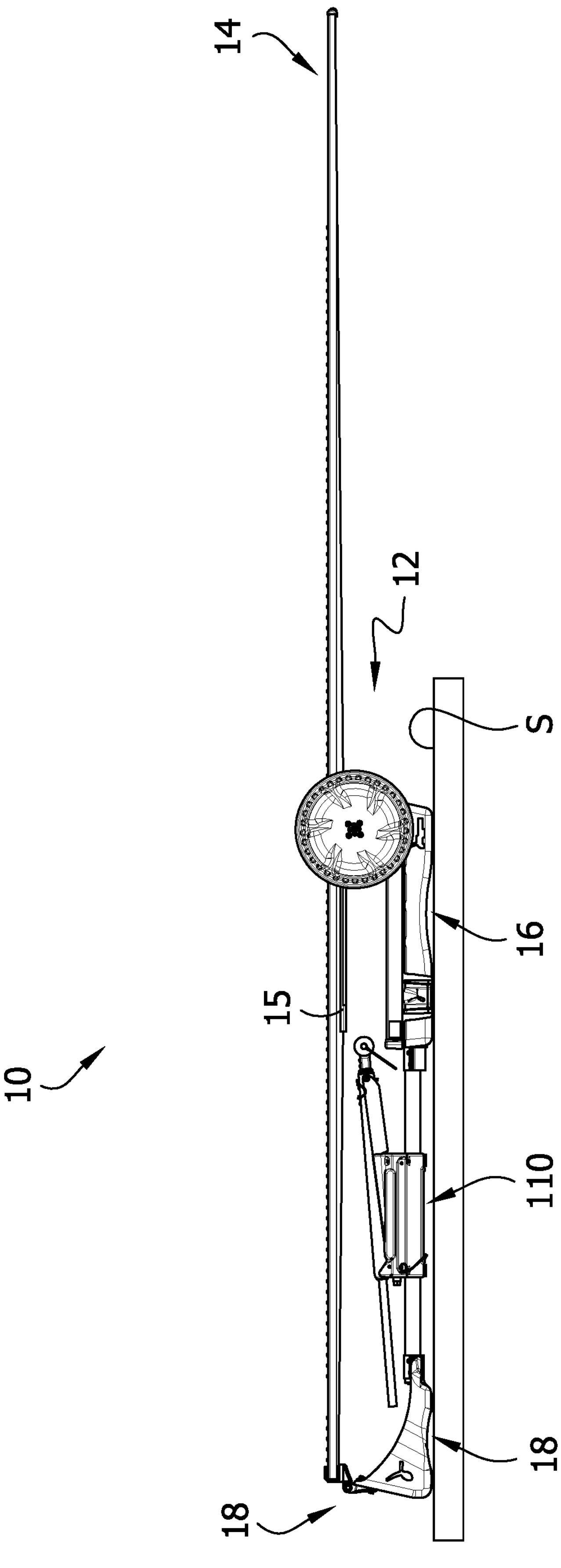
FIG. 1A is an elevation of the diving board assembly in the configuration of FIG. 1.
Figure 2:
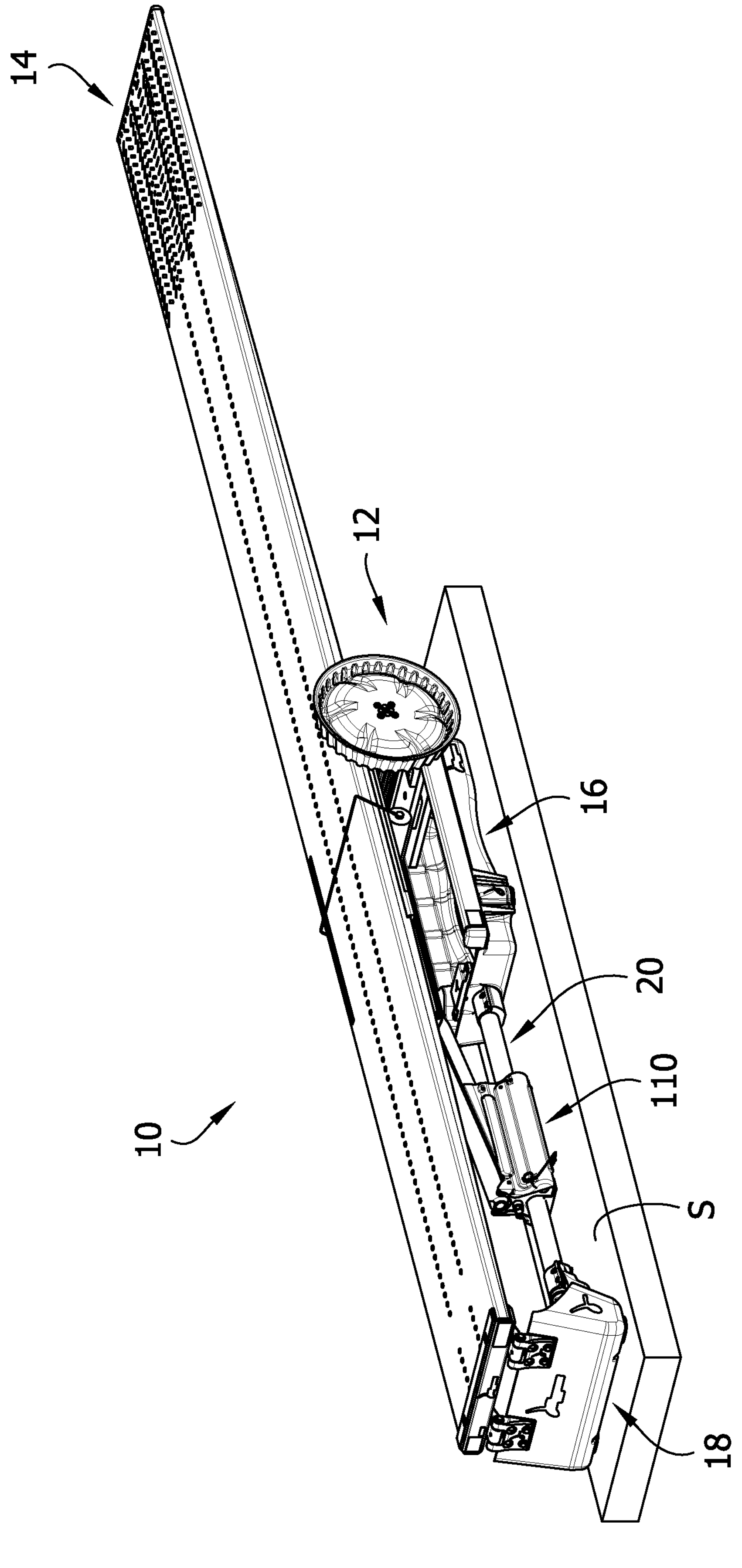
FIG. 2 is a perspective similar to FIG. 1 but showing the board lifter adjusted to a lowered configuration in which the board support member thereof is extended to contact the diving board.
Figure 2A:
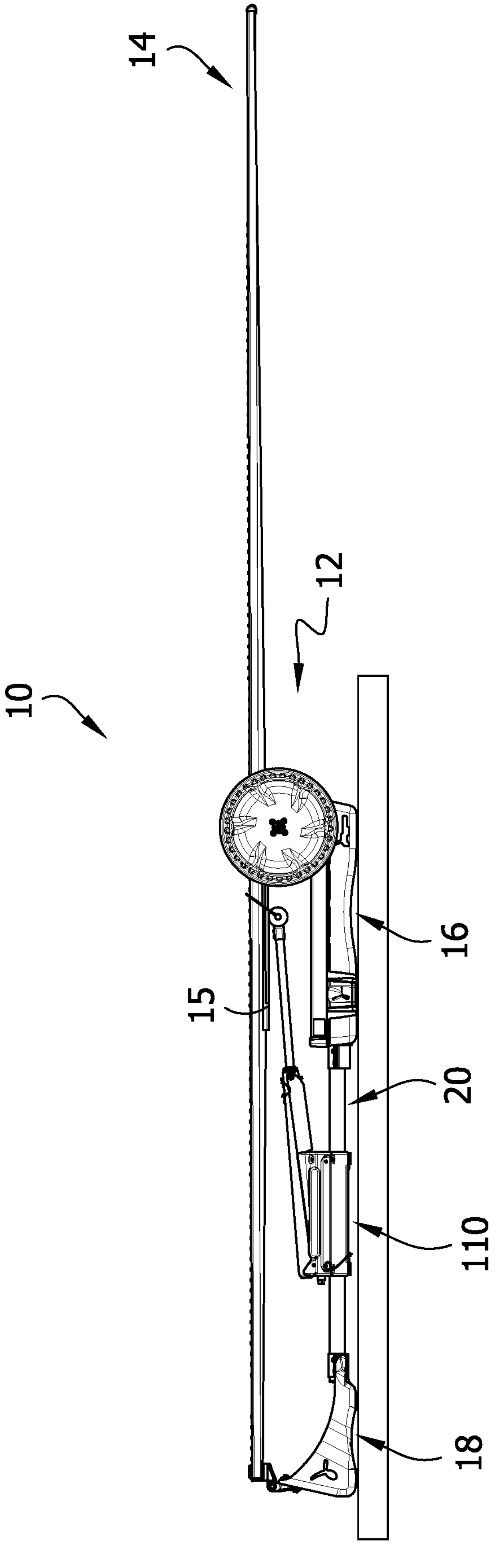
FIG. 2A is an elevation of the diving board assembly in the configuration of FIG. 2.

When the diving area of the pool is used for its normal purpose—i.e., diving from the diving board 14—the diving board assembly 110 is placed in the dive configuration shown in FIGS. 1 and 1A. In this configuration the board lifter 110 is out of the way of the diving board 14 and the diving board can move relative to the base 12 in the normal fashion, uninhibited by the board lifter 110.

When there is a need to use the diving area of the pool for a non-diving purpose, the board lifter 110 is used to lift the diving board 14 out of the way of the pool area. First the pin 149 is removed from the pivot shaft 156, and the extension shaft is extended so that the roller 180 contacts the traction material 15 on the bottom of the board 14. The pin 149 is then inserted back into the pivot shaft 156 to lock the extension shaft 148 in place. This configures the board lifter 110 in the intermediate configuration shown in FIGS. 2 and 2A.

In the intermediate configuration, the technician can loop the lanyard 182 over the top of the board 14 and secure it in place to laterally retain the diving board on the roller 180. The technician must also remove the lift locking pin 146 from the rear safety holes 144, 170 to allow the lift linkage to operate. With the lift locking pin 146 removed, a technician can use a ratchet set or powered driver to manually rotate the lead screw 150 from the input end 160. The carriage 152 advances forward along the lead screw 150 and the guide shafts 128, 130. As the carriage advances, the pivot arm 154 and pivot shaft 156 pivot with respect to the base 112, the carriage 152, and one another about the pivot axes STA, ATA, and ASA, respectively. The carriage 152 moves forward until it reaches the raising position at which the front safety holes 142, 168 align so that the locking pin 146 can be installed to lock the lift 116 in the raised configuration. As shown in FIGS. 3 and 3A, in the raised configuration, the board lifter 110 holds the diving board 14 up and out of the way of the pool area so that the pool area can be used for any non-diving purpose.

To return the diving board assembly 10 to the dive configuration, the technician removes the pin 146 and rotates the lead screw 150 to move the carriage 152 rearward to the lowering position at which the lift is in the lowered configuration. The technician returns the pin 146 to the rear safety holes 144, 170 and disconnects the lanyard 182. The technician lastly removes the extension shaft pin 149, retracts the extension shaft 148 so that the board support member 114 is spaced apart below the diving board 14, and returns the extension shaft pin 149 to lock the board lifter in the dive configuration. The diving board assembly 110 is again usable for diving.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A board lifter configured for selectively lifting a diving board to a raised position and lowering the diving board to a dive position, the diving board supported on a stand comprising a fulcrum assembly, a rear anchor, and an alignment rod having a first end portion fastened to the fulcrum assembly and an opposite second end portion fastened to the rear anchor, the board lifter comprising:

a base;

a board support member movable relative to the base between a lowered position and a raised position; and a lift operatively connecting the board support member to the base, the lift being selectively adjustable between a lowered configuration in which the lift is configured to position the board support member at the lowered position and a raised configuration in which the lift is configured to position the board support member at the raised position;

wherein the base is configured to mount the board lifter between the fulcrum assembly and the rear anchor along the alignment rod such that:

in the lowered position, the board member allows the diving board to be lowered to the dive position; and in the raised position, the board support member supports the diving board at the raised position;

wherein the lift is configured to be manually adjusted between the lowered configuration and the raised configuration;

wherein the lift comprises a lead screw configured to extend generally parallel to the alignment rod and a carriage threadably connected to the lead screw such that by rotation of the lead screw the carriage is moveable along the lead screw in a range of motion that includes a lowering position and a raising position.

2. The board lifter as set forth in claim 1, wherein the base is configured to straddle the alignment rod.

3. The board lifter as set forth in claim 1, wherein the base is configured to mount directly on the alignment rod.

4. The board lifter as set forth in claim 3, wherein the stand is supported on a substrate and wherein the base is configured to mount directly on the alignment rod such that the entire board lifter is spaced apart above the substrate.

5. The board lifter as set forth in claim 3, wherein the base comprises at least one clamping assembly comprising:

a saddle member configured to be positioned generally above and astraddle of the alignment rod; and a bottom piece configured to be selectively fastened to the saddle member to clamp the alignment rod between the saddle member and the bottom piece.

6. The board lifter as set forth in claim 1, wherein the lift further comprises a pivot shaft and a pivot arm, the pivot shaft having a shaft length extending from a first shaft end portion to a second shaft end portion, the pivot arm having an arm length extending from a first arm end portion to a second arm end portion, the first shaft end portion being pivotably connected to the base for rotation with respect to the base about a shaft tilt axis, the first arm end portion being pivotably connected to the carriage for rotation with respect to the carriage about an arm tilt axis, and the second arm end portion being pivotably connected to the pivot shaft at a location spaced apart along the shaft length from the first shaft end portion toward the second shaft end portion such that the base, the carriage, the pivot arm, and the pivot shaft form a linkage configured to pivot the pivot shaft about the shaft tilt axis as the carriage moves along the lead screw in the range of motion.

7. The board lifter as set forth in claim 6, wherein the linkage is configured to pivot the pivot shaft to a raising position when the carriage is in the raising position and wherein the linkage is configured to pivot the pivot shaft to the lowering position when the carriage is in the lowering position.

8. The board lifter as set forth in claim 7, wherein the board support member is configured to be connected to the pivot shaft such that the pivot shaft moves the board support member to the raised position when the pivot shaft is in the raising position and to the lowered position when the pivot shaft is in the raising position.

9. The board lifter as set forth in claim 8, further comprising an extension shaft connecting the board support member to the pivot shaft, the extension shaft being movable in relation to the pivot shaft between an extended position and a retracted position.

10. The board lifter as set forth in claim 9, wherein when the pivot shaft is in the lowering position, the extension shaft is configured to hold the board support member closer to the diving board in the extended position than in the retracted position.

11. The board lifter as set forth in claim 8, further comprising a locking pin, the base including a first safety hole and the carriage including a second safety hole configured to align with the first safety hole when the carriage is in the raising position such that the locking pin is insertable into the first and second safety holes to lock the carriage in the raising position and thereby provide a secondary mechanical safety lock locking the lift in the raised configuration.

12. The board lifter as set forth in claim 1, wherein the board support member comprises a roller configured to roll along a bottom surface of the diving board as the lift adjusts between the lowered configuration and the raised configuration.

13. A board lifter configured for selectively lifting a diving board to a raised position and lowering the diving board to a dive position, the diving board supported on a stand comprising a fulcrum assembly, a rear anchor, and an alignment rod having a first end portion fastened to the fulcrum assembly and an opposite second end portion fastened to the rear anchor, the board lifter comprising:

a base;

a board support member movable relative to the base between a lowered position and a raised position; and a lift operatively connecting the board support member to the base, the lift being selectively adjustable between a lowered configuration in which the lift is configured to position the board support member at the lowered position and a raised configuration in which the lift is configured to position the board support member at the raised position;

wherein the base is configured to mount the board lifter between the fulcrum assembly and the rear anchor along the alignment rod such that:

in the lowered position, the board member allows the diving board to be lowered to the dive position; and in the raised position, the board support member supports the diving board at the raised position;

wherein the board support member comprises a roller configured to roll along a bottom surface of the diving board as the lift adjusts between the lowered configuration and the raised configuration;

the board lifter further comprising a lanyard configured to retain the diving board laterally with respect to the roller.

14. A diving board assembly comprising:

a diving board stand comprising a fulcrum assembly, a rear anchor, and an alignment rod having a first end portion fastened to the fulcrum assembly and an opposite second end portion fastened to the rear anchor;

a diving board movable in relation to the stand between a raised position and a dive position; and the board lifter of claim 1 wherein the board lifter is configured to adjust the diving board between the raised position and the dive position by adjusting the lift between the raised configuration and the lowered configuration.

15. A board lifter configured for selectively lifting a diving board to a raised position and lowering the diving board to a dive position, the board lifter comprising:

a base;

a board support member movable relative to the base between a lowered position and a raised position; and a lift operatively connecting the board support member to the base, the lift being selectively adjustable between a lowered configuration in which the lift is configured to position the board support member at a lowered position and a raised configuration in which the lift is configured to position the board support member at the raised position;

wherein the lift comprises a lead screw mechanism for selectively adjusting the lift between the lowered configuration and the raised configuration, the lead screw mechanism providing a primary mechanical safety for locking the lift in the raised configuration;

wherein the board lifter further comprises a locking pin that is selectively positionable to lock a portion of the lift in place with respect to the base to lock the lift in the raising position relative to the base and thereby provide a secondary mechanical safety for locking the lift in the raised configuration.

16. A board lifter configured for selectively lifting a diving board to a raised position and lowering the diving board to a dive position, the board lifter comprising:

a base;

a board support member movable relative to the base between a lowered position and a raised position; and a lift operatively connecting the board support member to the base, the lift being selectively adjustable between a lowered configuration in which the lift is configured to position the board support member at a lowered position and a raised configuration in which the lift is configured to position the board support member at the raised position, the lift comprising:

a lead screw configured to be rotated about a screw axis;

a carriage threadably connected to the lead screw such that by rotation of the lead screw about the screw axis the carriage is moveable along the lead screw relative to the base in a range of motion that includes a lowering position and a raising position;

a pivot shaft having a shaft length extending from a first shaft end portion to a second shaft end portion, the first shaft end portion being pivotably connected to the base for rotation with respect to the base about a shaft tilt axis; and a pivot arm having an arm length extending from a first arm end portion to a second arm end portion, the first arm end portion being pivotably connected to the carriage for rotation with respect to the carriage about an arm tilt axis, and the second arm end portion being pivotably connected to the pivot shaft at a location spaced apart along the shaft length from the first shaft end portion toward the second shaft end portion such that the base, the carriage, the pivot arm, and the pivot shaft form a linkage configured to pivot the pivot shaft about the shaft tilt axis as the carriage moves along the lead screw in the range of motion;

wherein the linkage is configured to pivot the pivot shaft to a raising position when the carriage moves to the raising position whereby the linkage adjusts the lift to the raised configuration;

and wherein the linkage is configured to pivot the pivot shaft to the lowering position when the carriage moves to the lowering position whereby the linkage adjusts the lift to the lowered configuration.

17. A board lifter configured for selectively lifting a diving board to a raised position and lowering the diving board to a dive position, the board lifter comprising:

a base;

a board support member movable relative to the base between a lowered position and a raised position;

a lift operatively connecting the board support member to the base, the lift being selectively adjustable between a lowered configuration in which the lift is configured to position the board support member at a lowered position and a raised configuration in which the lift is configured to position the board support member at the raised position; and an extension shaft connecting the board support member to the lift, the extension shaft being movable in relation to the lift between an extended position and a retracted position, wherein when the lift is in the lowered configuration, the extension shaft is configured in the retracted position to position the board support member at a stowed position in which the board support member is spaced apart below the diving board and the extension shaft is configured in the extended position to position the board support member at the lowered position in contact with the diving board;

wherein the lift comprises a lift actuator configured to adjust the lift between the lowered configuration and the raised configuration and wherein the extension shaft is movable between the extended position and the retracted position independent of operation of the lift actuator.

18. A diving board assembly comprising:

a diving board stand including a fulcrum roller assembly comprising a fulcrum roller rollably adjustable in a lengthwise range of motion and a rear hinge;

a diving board supported on the stand, the diving board comprising a main body including a front end portion and a rear end portion opposite the front end portion, the rear end portion of the main body being fastened to the rear hinge such that the diving board is rotatable about the rear hinge between a dive position at which the diving board is supported on the fulcrum roller and a raised position at which the diving board is spaced apart from the fulcrum roller, the diving board further comprising a traction material along a section of the diving board between the front end portion and the rear end portion, the traction material configured so that the fulcrum roller rolls along the traction material along an entire extent of the range of motion when the diving board is in the dive position; and a board lifter comprising a base, a board support member, and lift configured for moving the board support member in relation to the base to lift the diving board from the dive position to the raised position, wherein the lift presses the board support member against the traction material at a location closer to the fulcrum roller than the rear hinge to lift the diving board from the dive position to the raised position.

19. The diving board assembly of claim 18, wherein the board support member is adjustable in relation to the lift between a stowed position and an operational position, the board support member being spaced apart below the diving board in the stowed position such that there is a gap between the board support member and the diving board, the board support member contacting the traction material in the operational positon.

* * * * *